US010259453B2

(12) United States Patent
Fletcher et al.

(10) Patent No.: US 10,259,453 B2
(45) Date of Patent: Apr. 16, 2019

(54) COLLISION AVOIDANCE BASED ON FRONT WHEEL OFF TRACKING DURING REVERSE OPERATION

(71) Applicant: Continental Automotive Systems, Inc., Auburn Hills, MI (US)

(72) Inventors: Graham Lanier Fletcher, Royal Oak, MI (US); Jeremy J McClain, Oxford, MI (US); David Leslie Agnew, Clarkston, MI (US); Ibro Muharemovic, Shelby Township, MI (US); Brandon Herzog, Waterford, MI (US); Joyce Chen, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/091,602

(22) Filed: Apr. 6, 2016

(65) Prior Publication Data

US 2016/0297432 A1  Oct. 13, 2016

Related U.S. Application Data

(60) Provisional application No. 62/146,011, filed on Apr. 10, 2015.

(51) Int. Cl.
*B60W 30/09* (2012.01)
*B60T 7/22* (2006.01)
(Continued)

(52) U.S. Cl.
CPC ............. *B60W 30/09* (2013.01); *B60D 1/245* (2013.01); *B60D 1/36* (2013.01); *B60D 1/62* (2013.01);
(Continued)

(58) Field of Classification Search
CPC ..................................................... B60W 30/09
See application file for complete search history.

(56) References Cited

U.S. PATENT DOCUMENTS

| 7,579,942 | B2 * | 8/2009 | Kalik | B60Q 9/00 |
| | | | | 340/425.5 |
| 9,403,413 | B2 * | 8/2016 | Talty | B60D 1/36 |

(Continued)

FOREIGN PATENT DOCUMENTS

| CN | 2559518 Y | 7/2003 |
| CN | 1795121 | 2/2005 |

(Continued)

OTHER PUBLICATIONS

European Search Report dated Sep. 9, 2016 for corresponding European application 16164446.3.

(Continued)

*Primary Examiner* — Hussein Elchanti
*Assistant Examiner* — Michael A Berns

(57) ABSTRACT

A method of avoiding a collision while operating a vehicle in reverse comprises detecting an object proximate to a vehicle with at least one sensor including detecting objects located along side of a vehicle and determining a predicted vehicle path, including a tracking path for front wheels of the vehicle. A probability is determined with a controller located within the vehicle of collision of one of the front corner and a side of the vehicle with the object while the vehicle is travelling in reverse and at least one collision avoidance response is determined with the controller based on the probability of collision.

20 Claims, 4 Drawing Sheets

(51) Int. Cl.
  *B62D 15/02* (2006.01)
  *B62D 13/06* (2006.01)
  *B60W 10/18* (2012.01)
  *B60W 10/20* (2006.01)
  *G05D 1/00* (2006.01)
  *B60D 1/36* (2006.01)
  *B60K 31/00* (2006.01)
  *B60D 1/24* (2006.01)
  *B60D 1/62* (2006.01)

(52) U.S. Cl.
  CPC ............ *B60K 31/0008* (2013.01); *B60T 7/22* (2013.01); *B60W 10/18* (2013.01); *B60W 10/20* (2013.01); *B62D 13/06* (2013.01); *B62D 15/0265* (2013.01); *G05D 1/0088* (2013.01); *B60W 2550/10* (2013.01)

(56) References Cited

U.S. PATENT DOCUMENTS

| | | | |
|---|---|---|---|
| 9,511,799 B2* | 12/2016 | Lavoie | B62D 13/06 |
| 9,633,566 B2* | 4/2017 | Skvarce | G08G 1/168 |
| 9,779,313 B2* | 10/2017 | Pliefke | G06K 9/00805 |
| 2005/0090955 A1 | 4/2005 | Engelman et al. | |
| 2011/0001825 A1 | 1/2011 | Hahn | |
| 2014/0222288 A1 | 8/2014 | Lavoie et al. | |
| 2014/0358417 A1 | 12/2014 | Lavoie et al. | |
| 2015/0321666 A1* | 11/2015 | Talty | B60D 1/62 701/41 |
| 2015/0344028 A1* | 12/2015 | Gieseke | B60W 30/00 701/1 |
| 2016/0052548 A1* | 2/2016 | Singh | B60D 1/36 701/37 |
| 2016/0075281 A1* | 3/2016 | Singh | B60D 1/36 348/118 |
| 2016/0304122 A1* | 10/2016 | Herzog | B60D 1/36 |
| 2017/0185852 A1* | 6/2017 | Pliefke | G06K 9/00805 |

FOREIGN PATENT DOCUMENTS

| | | |
|---|---|---|
| GB | 2513393 A | 10/2014 |
| JP | H01202581 A | 8/1989 |
| JP | 2004058829 A | 2/2004 |
| JP | 2008213646 A | 9/2008 |
| JP | 2011079372 A | 4/2011 |
| JP | 2014069645 A | 4/2014 |
| JP | 2014528862 A | 10/2014 |

OTHER PUBLICATIONS

Japanese Office Action dated Mar. 6, 2017 for corresponding Japanese application 2016-078000.

Chinese Office Action dated Jan. 22, 2018 for corresponding Chinese application No. 201610325995.8.

* cited by examiner

COLLISION AVOIDANCE BASED ON FRONT WHEEL OFF TRACKING DURING REVERSE OPERATION

CROSS-REFERENCE TO RELATED APPLICATIONS

This disclosure claims priority to U.S. Provisional Application No. 62/146,011, which was filed on Apr. 10, 2015 and is incorporated herein by reference.

TECHNICAL FIELD

The present disclosure relates to automotive vehicles and more particularly to driver assistance systems for automotive vehicles.

BACKGROUND

Advancements in sensor technology available have led to the ability to improve safety systems for vehicles. Arrangements and methods for detecting and avoiding collisions are becoming available. Such driver assistance systems use sensors located on the vehicle to detect an oncoming collision. The systems may warn the driver of various driving situations to prevent or minimize collisions. Additionally, sensors and cameras are also used to alert the driver of possible obstacles when the vehicle is traveling in reverse. Such systems are especially useful for increasing safety in vehicles which operate under autonomous or semi-autonomous conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of avoiding a collision while operating a vehicle in reverse comprises detecting an object proximate to a vehicle with at least one sensor including detecting objects located along side of a vehicle and determining a predicted vehicle path, including a tracking path for front wheels of the vehicle. A probability is determined with a controller located within the vehicle of collision of one of the front corner and a side of the vehicle with the object while the vehicle is travelling in reverse and at least one collision avoidance response is determined with the controller based on the probability of collision.

A method of avoiding a collision while operating a vehicle in reverse comprises detecting an object proximate to a vehicle with at least one sensor including detecting objects located along side of a vehicle and controlling the vehicle steering and braking systems with an independent input device for a trailer backing assist system. A controller determines a predicted vehicle path, including a tracking path for front wheels of the vehicle to determine an offset of the front wheel path, from the rear wheel path based upon a steering angle of the vehicle. A probability is determined with a controller located within the vehicle of collision of one of the front corner and a side of the vehicle with the object while the vehicle is travelling in reverse and at least one collision avoidance response is determined with the controller based on the probability of collision.

A backing system for a vehicle comprises a camera mounted to view a reverse path of a vehicle, at least one sensor able to detect objects along side of the vehicle, and a steering angle sensor to detect a steering angle of the vehicle. A controller includes instructions for: detecting an object proximate to a vehicle with the at least one sensor including detecting objects located along side of a vehicle, determining a predicted vehicle path, including a tracking path for front wheels of the vehicle, and determining a probability of collision with the object and at least one of a front corner and side of the vehicle. Finally, at least one collision avoidance response is determined based on the probability of collision.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
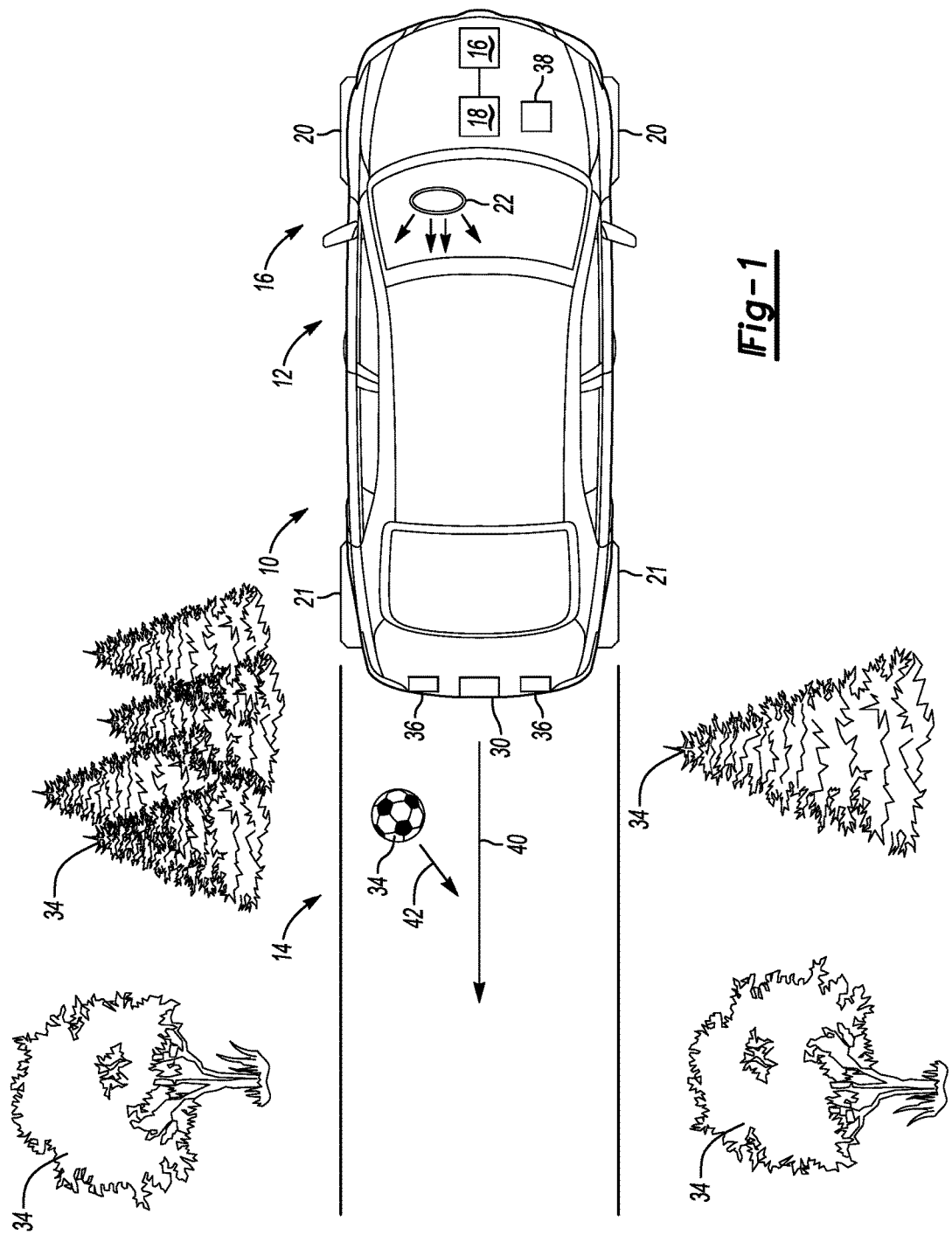
FIG. 1 is a schematic illustration of a top view of a vehicle having a disclosed backing system.

The following description is merely exemplary in nature and is in no way intended to limit the disclosure, its application, or uses. For purposes of clarity, the same reference numbers will be used in the drawings to identify similar elements.

Figure 2:
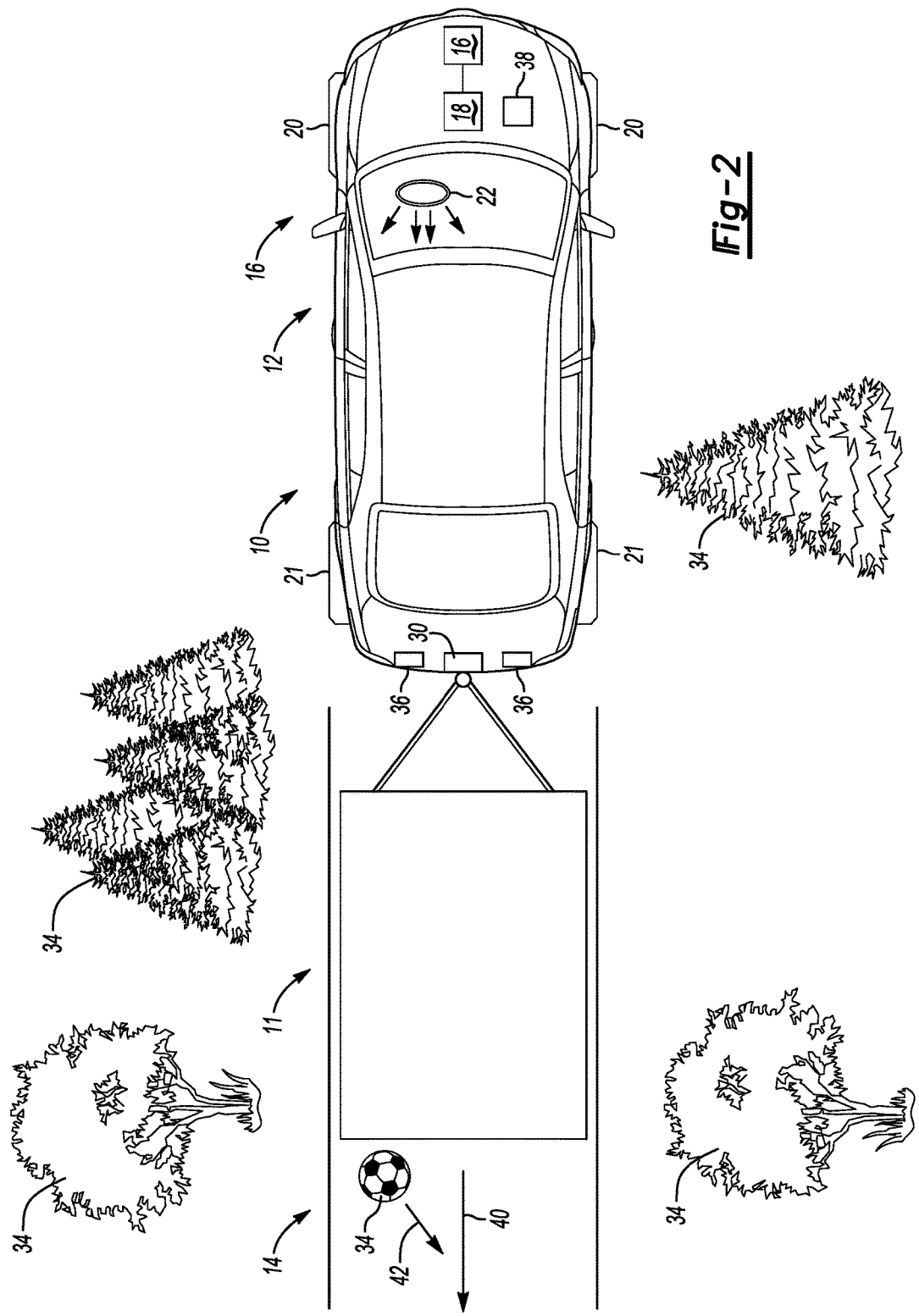
FIG. 2 is a schematic illustration of a top view of a vehicle and trailer having the disclosed backing system.

Referring to FIGS. 1 and 2, a vehicle 10 including a driver assistance system, in particular a backing system 12 is schematically shown. The backing system 12 provides assistance when the vehicle 10 is in reverse and may also be used to brake the vehicle 10 during autonomous and semi-autonomous vehicle operations. Throughout the application the relative directions of forward and rear are in reference to the direction which an operator for the vehicle 10 would typically be facing when operating the vehicle 10 in a drive gear on a public road. Therefore, in operation of the backing system 12 the vehicle 10 would be in a reverse gear and the operator may be facing backward.

The backing system 12 may be used along with other safety systems, such as an electronic brake system (EBS) 16. A common or separate controller 18 may be used by the systems 12, 14 and 16. Specifically, as shown in FIG. 2, the backing system 12 may be used with a trailer backing assist system 14, when a trailer 11 is secured to the vehicle 10. The trailer backing system 14 may provide an independent input to control steering and direction of the vehicle 10 and the trailer 11 while backing that does not require the steering wheel, and is thus easier for the operator. For example, the trailer backing system 14 may provide for wireless control of the vehicle 10 from a remote device that can be controlled while standing proximate to the vehicle 10 and trailer 11. When backing a vehicle 10 with a trailer 11 attached a vehicle operator often has difficulty watching all corners of the vehicle 10 and trailer 11 at the same time. The backing system 12 can assist the operator in monitoring the vehicle 10 and warning the driver, or taking other action to avoid collision. Alternative to braking to avoid the object one action, for example, may be limiting the steering angle of the vehicle 10 to prevent steering into the object.

The backing system 12 or a similar system determines a probability of collision when an object 34 is detected. If the probability of collision exceeds a predetermined threshold, the controller 18 indicates that at least one vehicle collision avoidance action is required. The required action can be in the form of a warning to a driver when an object is detected and/or the backing system 12 may be actuated to slow or stop the vehicle. A warning device 22 can be installed within the vehicle 10 and include a signal such as a light that is illuminated or an audible signal that alerts the driver to the presence of an object 34. Alternately, the input device for the trailer backing system 14 can also be provided with an alert.

The backing system 12 may also be used to brake the vehicle 10. The backing system 12 includes a camera 30 mounted to provide a view of a rear driving direction for the vehicle 10. The camera 30 may be a monocular camera, binocular camera, or another type of sensing device capable of providing a view of the rear travelling path of the vehicle 10. The camera 30 may be mounted in any location that provides a view of the rear driving path of the vehicle 10. The controller 18 may be connected to the camera 30 to analyze the image/data and identify objects 34 within the image that may be obstacles for the vehicle 10. Other cameras 16 may also be mounted on the vehicle 10 to provide a view of the environment surrounding the vehicle 10.

In addition to the camera 30, the backing system 12 may use additional sensors 36 to assist in identifying objects 34. In particular, the sensors 36 may be able to detect objects that are located along side the vehicle 10, such as the object 34 illustrated in FIG. 2. These sensors may be added sensors or sensors already on the car and used by other systems, such a blind spot detection sensors. The sensors 36 may identify objects 34 that are proximate to the vehicle 10. Additionally, because of front wheel off tracking which occurs when the vehicle is steered through a curved trajectory in reverse objects 34 that do not appear like they will have a probable collision with the rear of the vehicle 10 may still be a problem for the side of the vehicle 10.

Additional systems and sensors may also be used to detect objects proximate to the vehicle and include, but are not limited to: proximity sensors, LIDAR, RADAR, ultrasound, GPS 38, radio sensors, etc.

As soon as the vehicle 10 is started and shifted into reverse, the backup system 12 is started. A warning is provided to a driver when an obstacle is detected and at least one vehicle collision avoidance action is also provided when the probability that the object 34 is determined to be an obstacle exceeds a predetermined threshold.

Figure 3:
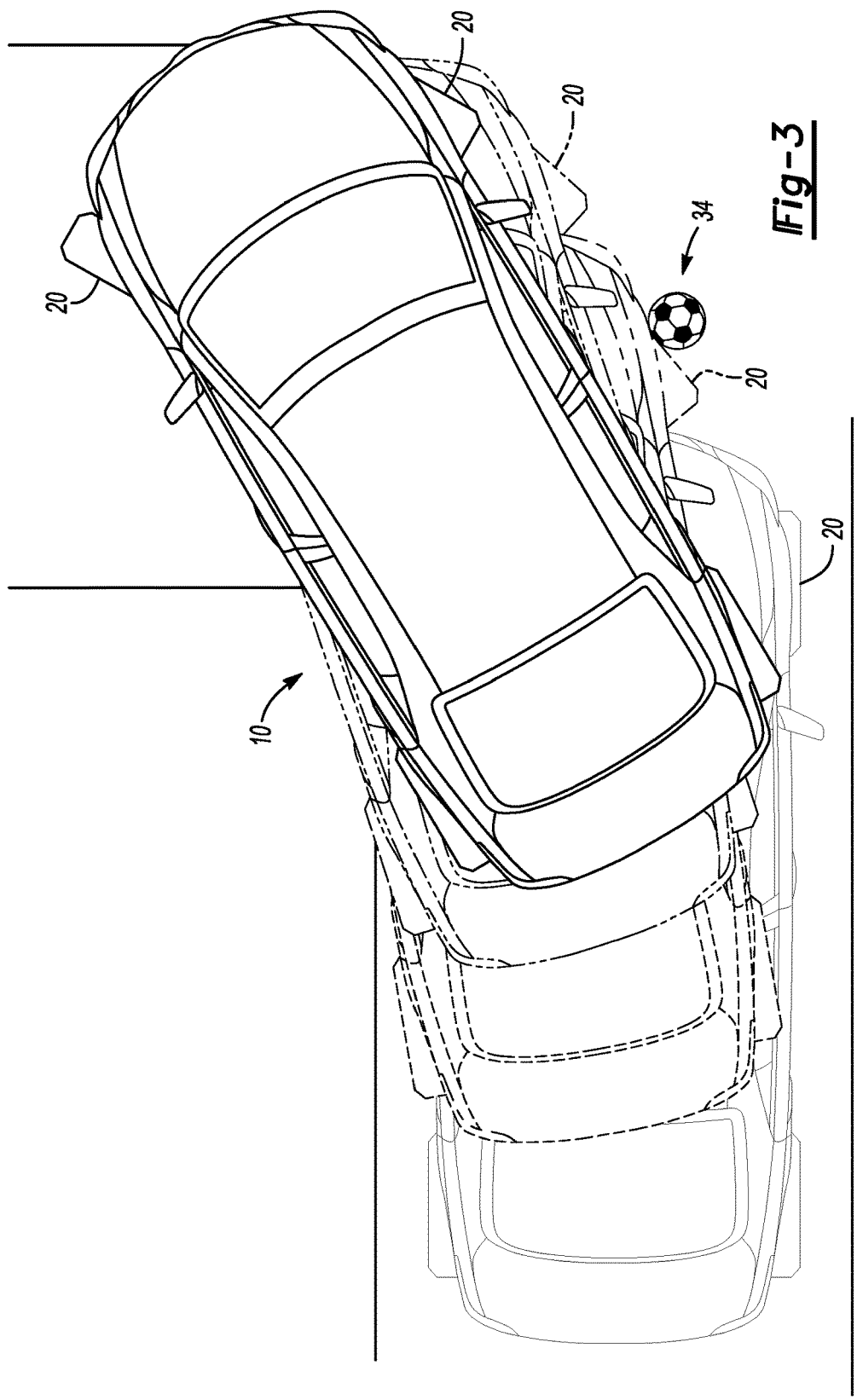
FIG. 3. is a schematic illustration of a top view of the vehicle having the disclosed backing system illustrating a collision prediction based on front wheel off track.
Figure 4:
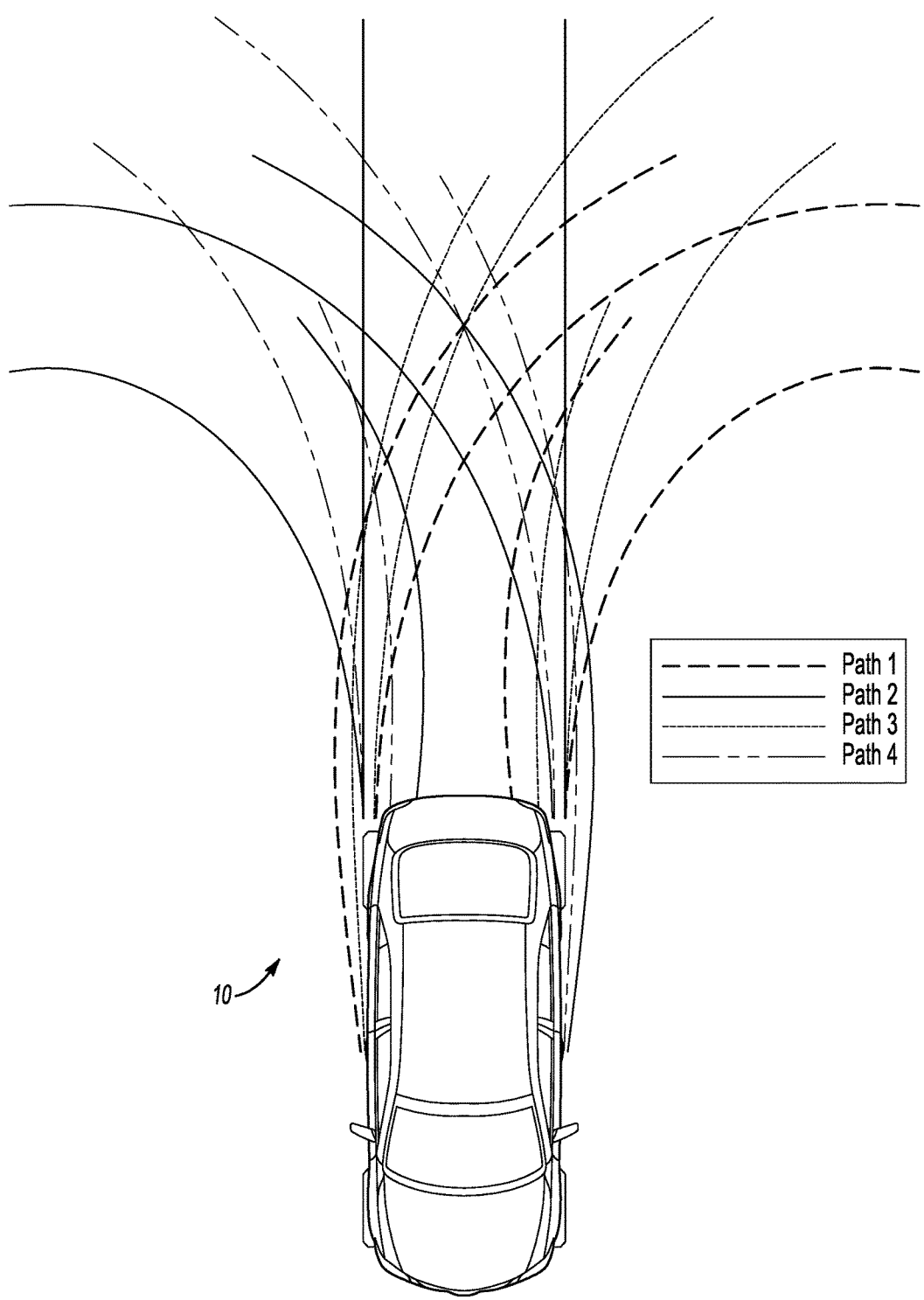
FIG. 4. is a schematic illustration of a top view of the vehicle illustrating front wheel off track for a variety of wheel angles.

The example controller 18 includes instructions for detecting an object 34 proximate to the vehicle 10 with at least one of the sensors 36, camera 30 and GPS system 38. The controller 18 further includes instructions for determining a collision confidence based upon the probability of collision with the object that is generated based on the predictive models. The controller 18 further includes instructions for determining a desired collision avoidance action based on the collision confidence. The probability of collision includes a determination of the predicted vehicle path 40, including predicting any off tracking that may occur by the front wheels of the vehicle, illustrated by dotted lines, 44 shown in FIGS. 2 and 3. For simplicity only the vehicle 10 is shown, however, the backing system 12 will operate in a similar manner when the trailer 11 is attached and the operator is using the trailer backing system 14.

The controller 18 executes an algorithm based on the predictive models of the vehicle path 40 and the object path 42. The controller 18 algorithm performs a probabilistic analysis of sensor-reported objects including fixed objects and moving pedestrians, expected and/or possible motion of a detected pedestrian, and expected and/or possible driver input. Current vehicle path and potential driver input is utilized to predict a range of potential vehicle paths. If a predicted vehicle path and predicted pedestrian path (or a static object's position) intersects then a potential collision is indicated. Of all of the potential collisions that are detected, one will require intervention before the others, and that one will be acted upon. The backing system 12 therefore provides lateral vehicle protection. In particular, for protection against collisions that would occur due to front wheel off tracking while the vehicle is in reverse.

The algorithm implements the following loop: predict all potential collisions; determine how confident we are that each detected collision will occur; determine which detected collision will require intervention first; and calculate the optimal response for the most relevant collision. As the collision confidence changes, due to e.g. vehicle movement, object movement as the car is moving, the desired vehicle 10 response may also be changed. The controller 18 continually generates updated predictive models based on movement of the object 34 and the vehicle 10 to enable recalculation of the confidence number over the course of the braking maneuver.

With reference to FIGS. 1-4, in operation, the backup system 12 detects the vehicle motion including velocity, path and steering angle. The detected parameters are utilized by the controller 18 to generate a predictive model of the vehicle path at future time and over a defined distance. The predictive model of the vehicle path includes any off track of the front wheels that will occur as a result of steering the vehicle 10 along a curved path. At the same time, the cameras 30, sensors 36 and other detection systems are utilized to detect objects proximate the vehicle 10. The objects identified proximate the vehicle are classified. Classification can include identifying if the object is fixed or moving and if moving at what speed and direction. The information obtained regarding the proximate objects is utilized to generate a predictive model of possible locations of a moving object at some future time. The predictive model can account for movement in view of the type of object, such as whether the object is a pedestrian walking or riding a bike. Movement of the pedestrian may also be predicted based on other identifying characteristics, such as whether the pedestrian is an adult or child.

The controller 18 continually updates the predictive models and thereby updates the collision confidence. As the collision confidence changes, due to e.g. vehicle movement, object movement as the car is moving, the desired vehicle response may also be changed. The controller 18 for the backing system 12 determines the collision confidence, while a separate controller may determine the desired braking rate, steering rate, etc. Alternatively, the same controller 18 may perform two or more functions.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of avoiding a collision while operating a vehicle in reverse comprising:
    detecting an object proximate to a vehicle with at least one sensor including detecting objects located along side of a vehicle;
    determining a predicted vehicle path, including a tracking path for front wheels of the vehicle;
    determining with a controller located within the vehicle a probability of collision of one of the front corner and a side of the vehicle with the object while the vehicle is travelling in reverse; and
    if the determined probability of collision exceeds a predetermined threshold, initiating at least one collision avoidance response with the controller;
    wherein determining the predicted vehicle path includes determining an offset of the front wheel path from the rear wheel path based upon a steering angle of the vehicle.

2. The method as recited in claim 1, wherein an object along the side of the vehicle is detected with sensors also used by another vehicle system.

3. The method of claim 1, wherein the at least one collision avoidance response is applying brakes of the vehicle with an automatic brake system.

4. The method of claim 3, wherein applying the vehicle brakes further includes sending instructions to an electronic brake system to apply the vehicle brakes.

5. The method as recited in claim 1, further comprising analyzing data from the at least one sensor with a controller to determine characteristics of the object and if the object detected is an obstacle for the vehicle to avoid.

6. The method as recited in claim 5, including generating a predictive model of the object that includes a range of possible locations of the object at a future time with associated values of probability based on current characteristics of the object.

7. The method of claim 1, wherein the controller includes instructions for calculating a steering maneuver to avoid an object located along side of the vehicle with a probability of collision above the predetermined threshold and sending the instructions to an electric power steering system.

8. The method as recited in claim 1, further comprising controlling the vehicle steering and braking systems with one of a trailer backing assist system and a hitch assist system.

9. The method as recited in claim 8, further comprising controlling the vehicle steering and braking with an independent input device for the trailer backing assist system.

10. The method as recited in claim 8, further comprising controlling the vehicle steering and braking with an independent input device and a controller for the hitch assist system in one of an autonomous and semi-autonomous manner.

11. A method of avoiding a collision while operating a vehicle and trailer in reverse comprising:
    detecting an object proximate to the vehicle with at least one sensor including detecting objects located along side of the vehicle;
    controlling the vehicle steering and braking systems with an independent input device for a trailer backing assist system;
    determining a predicted vehicle path, including a tracking path for front wheels of the vehicle to determine an offset of the front wheel path, from a rear wheel path based upon a steering angle of the vehicle;
    determining a probability of collision with the object with a controller located within the vehicle; and
    if the determined probability of collision exceeds a predetermined threshold, initiating at least one collision avoidance response with the controller based on the probability of collision;
    wherein determining the predicted vehicle path includes determining an offset of the front wheel path, from the rear wheel path based upon a steering angle of the vehicle.

12. The method as recited in claim 11, wherein an object along the side of the vehicle is detected with sensors also used by another vehicle system.

13. The method of claim 11, wherein the at least one collision avoidance action is applying the vehicle brakes with an automatic brake system.

14. The method as recited in claim 11, further comprising analyzing data from the at least one sensor with a controller to determine characteristics of the object and if the object detected is an obstacle for the vehicle to avoid.

15. The method as recited in claim 14, including generating a predictive model of the object that includes a range of possible locations of the object at a future time with associated values of probability based on current characteristics of the object.

16. A backing system for a vehicle comprising:
    a camera mounted to a reverse path of a vehicle;
    at least one sensor able to detect objects along side of the vehicle;
    a steering angle sensor to detect a steering angle of the vehicle; and
    a controller including instructions for:
        detecting an object proximate to a vehicle with the at least one sensor including detecting objects located along side of a vehicle;
        determining a predicted vehicle path, including a tracking path for front wheels of the vehicle;
        determining a probability of collision with the object and at least one of a front corner and side of the vehicle; and
        if the determined probability of collision exceeds a predetermined threshold, initiating at least one collision avoidance response based on the probability of collision;
        wherein determining the predicted vehicle path includes determining an offset of the front wheel path, from the rear wheel path based upon a steering angle of the vehicle.

17. The backing system of claim 16, wherein an electric power steering system is connected to the controller, and wherein the controller includes instructions for calculating a steering maneuver to avoid an object located along side of the vehicle with a probability of collision above the predetermined threshold.

18. The backing system of claim 16, wherein a trailer is attached to the vehicle.

19. The backing system of claim 18, further comprising an independent input device which is controllably connected to steer and brake the vehicle.

20. The backing system of claim 19, wherein the independent input device is wireless.

\* \* \* \* \*